(12) United States Patent
Pedersen et al.

(10) Patent No.: US 10,785,585 B2
(45) Date of Patent: *Sep. 22, 2020

(54) METHOD OF MANUFACTURING A HEARING DEVICE AND HEARING DEVICE WITH CERTIFICATE

(71) Applicant: GN HEARING A/S, Ballerup (DK)

(72) Inventors: Brian Dam Pedersen, Ringsted (DK); Allan Munk Vendelbo, Valby (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/697,406

(22) Filed: Sep. 6, 2017

(65) Prior Publication Data
US 2017/0374480 A1  Dec. 28, 2017

Related U.S. Application Data

(63) Continuation of application No. 14/799,338, filed on Jul. 14, 2015.

(30) Foreign Application Priority Data

Jul. 2, 2015  (DK) .................................. 2015 70438
Jul. 2, 2015  (EP) ..................................... 15175142

(51) Int. Cl.
*H04R 25/00* (2006.01)
*H04R 31/00* (2006.01)
(Continued)

(52) U.S. Cl.
CPC ............. *H04R 25/70* (2013.01); *G06F 21/73* (2013.01); *H04L 9/3268* (2013.01);
(Continued)

(58) Field of Classification Search
CPC .. H04R 25/505; H04R 25/554; H04R 25/556; H04R 25/558; H04R 25/70;
(Continued)

(56) References Cited

U.S. PATENT DOCUMENTS 5,757,920 A   5/1998  Misra et al.
5,809,140 A   9/1998  Rubin et al.
(Continued)

FOREIGN PATENT DOCUMENTS

DE  102 00 796 A1  7/2003
DK  2013 70266 A1  11/2014
(Continued)

OTHER PUBLICATIONS

Non Final Office Action dated May 11, 2018 for related U.S. Appl. No. 15/941,816.
(Continued)

*Primary Examiner* — Huyen D Le
(74) *Attorney, Agent, or Firm* — Vista IP Law Group, LLP

(57) ABSTRACT

A hearing device includes: a processing unit configured to compensate for hearing loss of a user of the hearing device; a memory unit; and an interface; wherein the memory unit has a hearing device certificate stored therein, the hearing device certificate comprising: a hearing device identifier, a plurality of hearing device keys, at least one hearing device key identifier indicative of one of the hearing device keys.

43 Claims, 5 Drawing Sheets

(51) Int. Cl.
*H04L 29/06* (2006.01)
*H04L 9/32* (2006.01)
*G06F 21/73* (2013.01)

(52) U.S. Cl.
CPC ....... *H04L 63/0823* (2013.01); *H04R 25/505* (2013.01); *H04R 25/55* (2013.01); *H04R 25/554* (2013.01); *H04R 25/556* (2013.01); *H04R 31/00* (2013.01); *H04R 25/558* (2013.01); *H04R 2225/55* (2013.01)

(58) Field of Classification Search
CPC . H04R 2225/55; H04L 9/3268; H04L 63/062; H04L 63/0823; H04W 12/04; H04W 12/06
USPC .................... 381/60, 312, 314, 315; 600/559
See application file for complete search history.

(56) References Cited

U.S. PATENT DOCUMENTS

| | | | |
|---|---|---|---|
| 6,055,575 | A | 4/2000 | Paulsen |
| 6,556,686 | B1* | 4/2003 | Weidner ............... H04R 25/556 381/312 |
| 6,658,307 | B1 | 12/2003 | Mueller |
| 6,724,862 | B1 | 4/2004 | Shaffer |
| 8,166,312 | B2* | 4/2012 | Waldmann ............ H04R 25/70 381/312 |
| 8,670,355 | B1 | 3/2014 | Frerking |
| 8,812,851 | B2 | 8/2014 | Schwarz |
| 9,219,966 | B2* | 12/2015 | Wang ...................... H04W 4/02 |
| 9,402,179 | B1 | 7/2016 | Miller |
| 9,608,807 | B2 | 3/2017 | Pedersen et al. |
| 9,613,028 | B2 | 4/2017 | Foo |
| 9,877,123 | B2* | 1/2018 | Pedersen ................ H04R 25/70 |
| 9,887,848 | B2* | 2/2018 | Pedersen .............. H04L 9/3268 |
| 2002/0054689 | A1 | 5/2002 | Zhang et al. |
| 2002/0169717 | A1 | 11/2002 | Challener |
| 2002/0196159 | A1 | 12/2002 | Lesenne et al. |
| 2004/0071304 | A1 | 4/2004 | Yanz |
| 2004/0117650 | A1 | 6/2004 | Karaoguz et al. |
| 2004/0117818 | A1 | 6/2004 | Karaoguz et al. |
| 2004/0125958 | A1 | 7/2004 | Brewster |
| 2004/0162980 | A1 | 8/2004 | Lesenne et al. |
| 2005/0154889 | A1 | 7/2005 | Ashley et al. |
| 2006/0005237 | A1 | 1/2006 | Kobata et al. |
| 2006/0129848 | A1 | 6/2006 | Paksoy |
| 2007/0078866 | A1 | 4/2007 | Takashima |
| 2008/0049957 | A1 | 2/2008 | Topholm |
| 2009/0210699 | A1 | 8/2009 | Grewal et al. |
| 2010/0067711 | A1 | 3/2010 | Waldmann |
| 2010/0104122 | A1 | 4/2010 | Waldmann |
| 2010/0205447 | A1 | 8/2010 | Waldmann |
| 2010/0290627 | A1 | 11/2010 | Tsuji et al. |
| 2010/0306525 | A1 | 12/2010 | Ferguson |
| 2011/0188684 | A1 | 8/2011 | Spieler et al. |
| 2011/0293124 | A1 | 12/2011 | Ma |
| 2012/0036364 | A1 | 2/2012 | Yoneda et al. |
| 2012/0140962 | A1 | 6/2012 | Ubezio et al. |
| 2012/0252411 | A1 | 10/2012 | Johnsgard et al. |
| 2012/0252531 | A1 | 10/2012 | King |
| 2013/0024798 | A1 | 1/2013 | Scheider |
| 2013/0077791 | A1 | 3/2013 | Kozuka et al. |
| 2013/0177188 | A1 | 7/2013 | Apfel |
| 2013/0177189 | A1 | 7/2013 | Bryant |
| 2013/0202138 | A1 | 8/2013 | Nishizaki et al. |
| 2013/0251179 | A1 | 9/2013 | Aschoff |
| 2013/0257364 | A1 | 10/2013 | Redding |
| 2013/0290733 | A1 | 10/2013 | Branton et al. |
| 2013/0290734 | A1 | 10/2013 | Branton et al. |
| 2013/0329924 | A1 | 12/2013 | Fleizach |
| 2014/0004825 | A1 | 1/2014 | Prakash |
| 2014/0050341 | A1 | 2/2014 | Flynn |
| 2014/0193008 | A1 | 7/2014 | Zukic |
| 2014/0211973 | A1 | 7/2014 | Wang et al. |
| 2014/0289516 | A1 | 9/2014 | Sahay |
| 2014/0331064 | A1 | 11/2014 | Ballesteros |
| 2014/0334629 | A1 | 11/2014 | Andersen et al. |
| 2014/0341405 | A1 | 11/2014 | Pedersen et al. |
| 2015/0023512 | A1 | 1/2015 | Shennib |
| 2015/0023534 | A1 | 1/2015 | Shennib |
| 2015/0289062 | A1 | 10/2015 | Ungstrup |
| 2016/0142838 | A1 | 5/2016 | Thomsen |
| 2016/0198271 | A1 | 7/2016 | Shennib |
| 2016/0255448 | A1 | 9/2016 | Morant |
| 2016/0337769 | A1 | 11/2016 | Siddhartha |
| 2017/0006029 | A1* | 1/2017 | Pedersen ................. H04W 4/80 |
| 2017/0099550 | A1 | 4/2017 | Blessing |
| 2017/0180419 | A1* | 6/2017 | Pedersen ................... H04L 9/14 |
| 2017/0180886 | A1 | 6/2017 | Van Der Loo |
| 2017/0286918 | A1 | 10/2017 | Westermann |
| 2017/0318400 | A1 | 11/2017 | Westermann |
| 2017/0318457 | A1 | 11/2017 | Westermann |

FOREIGN PATENT DOCUMENTS

| | | |
|---|---|---|
| EP | 1 582 958 A2 | 10/2005 |
| EP | 2 760 225 A1 | 7/2014 |
| EP | 2 928 212 A1 | 10/2015 |
| EP | 3 021 545 A1 | 5/2016 |
| EP | 3 032 845 A1 | 6/2016 |
| WO | WO 2007/098605 A1 | 9/2007 |
| WO | WO 2007/144435 A2 | 12/2007 |
| WO | WO 2007/144435 A3 | 12/2007 |
| WO | WO 2013/091693 A1 | 6/2013 |
| WO | WO 2014/094866 A1 | 6/2014 |
| WO | WO 2015132419 A2 | 9/2015 |
| WO | WO 2016/078711 | 5/2016 |
| WO | WO 2016/096011 | 6/2016 |

OTHER PUBLICATIONS

Non Final Office Action dated Apr. 20, 2018 for related U.S. Appl. No. 15/888,583.
Extended European Search Report dated Nov. 20, 2015 for related EP Patent Application No. 15175137.7.
Extended European Search Report dated Dec. 14, 2015 for related EP Patent Application No. 15175135.1.
Joann Spera, "SSL client authentication: It's a matter of trust", Mar. 2, 1998.
Li Wei, "Improvement Method of SSL Protocol Identity Authentication based on the Attribute Certificate", 2012 International Conference on Computer Science and Service System, IEEE Computer Society, Aug. 11, 2012.
Extended European Search Report dated Jan. 4, 2016 for related EP Patent Application No. 151751378.5.
John Padgette, et al., "Guide to Bluetooth Security Recommendations of the National Institute of Standards and Technology", Jun. 2012.
"Link Manager Protocol Specification , 4 Procedure Rules, 4.1 Connection Control, 4.2 Security" In: Bluetooth Specification v4.0, Core System Package,Bluetooth.com, vol. 2, Jun. 30, 2010.
"Message Sequence Charts, 4 Optional Activities After ACL Connection Establishment, 4.2 Simple Pairing Message Sequence Charts" In: Bluetooth Specification v4.0, Core System Package, Bluetooth.com, vol. 2, Jun. 30, 2010.
"Security Specification" In: Bluetooth Specification v4.0, Core System Package, Bluetooth.com, vol. 2, Jun. 30, 2010.
Extended European Search Report dated Dec. 14, 2015 for related EP Patent Application No. 15175141.9.
Vincent Bernat: "Speeding up SSL: enabling session reuse", Sep. 27, 2011.
Extended European Search Report dated Dec. 23, 2015 for related EP Patent Application No. 15175139.3.
Leicher A et al., "Implementation of a Trusted Ticket System", Emerging Challenges for Security, Privacy and Trust. IFIP Advances in Information and Communication Technology, vol. 297, Jan. 1, 2009.

(56) References Cited

OTHER PUBLICATIONS

First Technical Examination and Search Report dated Jan. 25, 2016 for corresponding/related Danish Patent Application No. PA 2015 70437, 5 pages.
Extended European Search Report dated Jan. 11, 2016 for corresponding/related EP Patent Application No. 15175142.7, 10 pages.
Gary C. Kessler, "An Overview of Cryptography", Nov. 17, 2006.
Menezes et al., "Handbook of Applied Cryptography, Key Management Techniques", Jan. 1, 1997.
First Technical Examination and Search Report dated Feb. 23, 2016 for corresponding/related Danish Patent Application No. PA 2015 70435, 5 pages.
Extended European Search Report dated Jan. 12, 2016 for corresponding/related EP Patent Application No. 15175140.1, 8 pages.
First Technical Examination and Search Report dated Feb. 25, 2016 for corresponding/related Danish Patent Application No. PA 2015 70436.
First Technical Examination and Search Report dated Feb. 25, 2016 for corresponding/related Danish Patent Application No. PA 2015 70434.
First Technical Examination and Search Report dated Feb. 22, 2016 for corresponding/related Danish Patent Application No. PA 2015 70432.
First Technical Examination and Search Report dated Feb. 29, 2016 for corresponding/related Danish Patent Application No. PA 2015 70433.
First Technical Examination and Search Report dated Feb. 25, 2016 for corresponding/related Danish Patent Application No. PA 2015 70438.
Non-final Office Action dated Sep. 22, 2016 for related U.S. Appl. No. 14/793,515.
Non-final Office Action dated Sep. 26, 2016 for related U.S. Appl. No. 14/799,402.
Non-final Office Action dated Sep. 30, 2016 for related U.S. Appl. No. 14/799,437.
Non-final Office action dated Oct. 7, 2016 for related U.S. Appl. No. 14/793,587.
Notice of Allowance and Fees Due dated Jan. 19, 2017 for related U.S. Appl. No. 14/793,466.
Non-final Office Action dated Feb. 10, 2017 for related U.S. Appl. No. 14/799,463.
Final Office Action dated Mar. 9, 2017 for U.S. Appl. No. 14/793,515.
Final Office Action dated Feb. 17, 2017 for related U.S. Appl. No. 14/799,402.
Final Office Action dated May 12, 2017 for related U.S. Appl. No. 14/793,587.
Second Technical Examination and Search Report dated Apr. 5, 2017 for corresponding/related Danish Patent Application No. PA 2015 70432, 3 pages.
Final Office Action dated May 30, 2017 for related U.S. Appl. No. 14/799,437.
Advisory Action dated Jun. 22, 2017 for related U.S. Appl. No. 14/793,515.
Notice of Allowance and Fee(s) due dated Jun. 23, 2017 for related U.S. Appl. No. 14/799,463.
Notice of Allowance and Fee(s) due dated Jul. 11, 2017 for related U.S. Appl. No. 14/799,402.
Non-final Office Action dated Jul. 20, 2017 for related U.S. Appl. No. 15/595,526.
Non-final Office Action dated Jul. 21, 2017 for related U.S. Appl. No. 15/623,266.
Non-final Office Action dated Aug. 14, 2017 for related U.S. Appl. No. 14/793,515.
Notice of Allowance and Fee(s) dated Aug. 24, 2017 for related U.S. Appl. No. 14/799,463.
Advisory Action dated Oct. 23, 2017 for related U.S. Appl. No. 14/799,437.
Notice of Allowance and Fee(s) dated Oct. 6, 2017 for related U.S. Appl. No. 14/799,402.
Advisory Action dated Nov. 16, 2017 for related U.S. Appl. No. 14/793,587.
Notice of Allowance and Fee(s) due dated Nov. 3, 2017 for related U.S. Appl. No. 15/595,526.
Final Office Action dated Dec. 14, 2017 for related U.S. Appl. No. 15/623,266.
Non-final Office Action dated Dec. 21, 2017 for related U.S. Appl. No. 14/799,437.
Non-final Office Action dated Jan. 26, 2018 for related U.S. Appl. No. 14/799,463.
Second Technical Examination dated Jul. 21, 2017 for corresponding/related Danish Patent Application No. PA 2015 70434, 3 pages.
Notice of Allowance and Fee(s) dated Sep. 13, 2017 for related U.S. Appl. No. 14/799,338.
Notice of Allowance and Fees Due dated May 18, 2017 for related U.S. Appl. No. 14/799,338.
Final Office Action dated May 17, 2018 for related U.S. Appl. No. 14/799,463.
Notice of Allowance dated May 3, 2018 for related U.S. Appl. No. 14/793,587.
Advisory Action dated Jun. 25, 2018 for related U.S. Appl. No. 14/793,515.
Final Office Action dated Jul. 5, 2018 for related U.S. Appl. No. 14/799,437.
Notice of Allowance and Fee(s) dated Jul. 31, 2018 for related U.S. Appl. No. 14/793,515.
Notice of Allowance and Fee(s) dated Aug. 1, 2018 for related U.S. Appl. No. 14/799,463.
Japanese Office Action dated Apr. 13, 2019 for corresponding JP Patent Application No. 2016-128038.
English Translation of Japanese Office Action dated Apr. 13, 2019 for corresponding JP Patent Application No. 2016-128038.
Adivsory Action dated Mar. 7, 2018 for related U.S. Appl. No. 15/623,266.
Communication pursuant to Article 94(3) dated Dec. 8, 2017 for related EP Patent Application No. 15175135.1.
Notice of Allowance dated Mar. 27, 2018 for related U.S. Appl. No. 15/623,266.
Final Office Acction dated Apr. 2, 2018 for related U.S. Appl. No. 14/793,515.
Communication pursuant to Article 94(3) dated Jan. 3, 2018 for corresponding EP Patent Application No. 15175141.9.
Communication Pursuant to Article 94(3) dated Jul. 8, 2020 for corresponding EP Patent Application No. 15 175 142.7.
Kleidermacher, et al. "Embedded Systems Security: Practical Methods for Safe and Secure Software and Systems Development, Chapter 4 Embedded Cryptography", Apr. 25, 2012, Elsevier, NL, pp. 209-288.
Anonymous, "Bluetooth Specification version 4.2" Bluetooth SIG, Dec. 2, 2014, pp. 1-2772.

\* cited by examiner

METHOD OF MANUFACTURING A HEARING DEVICE AND HEARING DEVICE WITH CERTIFICATE

RELATED APPLICATION DATA

This application is a continuation of U.S. patent application Ser. No. 14/799,338, filed Jul. 14, 2015, now U.S. Pat. No. 9,877,123, which claims priority to and the benefit of Danish Patent Application No. PA 2015 70438 filed on Jul. 2, 2015, pending, and European Patent Application No. 15175142.7 filed on Jul. 2, 2015, pending. The entire disclosures of the above applications are expressly incorporated by reference herein.

FIELD

The present disclosure pertains to the field of hearing devices, and in particular to hearing device security. The present disclosure relates to a hearing device with one or more certificates and a method of manufacturing a hearing device.

BACKGROUND

Functionalities of a hearing device become increasingly advanced. Wireless communications between a hearing device and external devices, such as hearing device fitting apparatus, tablets, smart phones, smart watches, and remote controllers, have evolved. A wireless communication interface of a hearing device uses an open standard-based interface. However, this poses many challenges in terms of security. A hearing device may assume any incoming data as legitimate, and may allow memory to be written or changed by an unauthorized party. Any such attacks may result in a malfunction of the hearing aid, or a battery exhaustion attack.

However a hearing device is a very small device with strict constraints in terms of computational power, memory space etc.

SUMMARY

There is a need for methods and hearing device providing improved security.

Disclosed is a hearing device. The hearing device comprises a processing unit, a memory unit and an interface. The memory unit may have one or more certificates stored thereon. The memory unit has a hearing device certificate stored thereon. The hearing device certificate may comprise a hearing device identifier, at least one hearing device key identifier indicative of a hearing device key and one or a plurality of hearing device keys.

Also disclosed is a method of manufacturing a hearing device. The hearing device comprises a processing unit configured to compensate for hearing loss of a user of the hearing device, a memory unit, and an interface. The method comprises generating a hearing device identifier. The method may comprise generating one or more hearing device keys based on the hearing device identifier. The method comprises generating a hearing device certificate including the hearing device identifier and at least one of the generated hearing device keys; and transmitting the hearing device certificate to the hearing device.

The method and apparatus as disclosed provides a scalable security architecture for manufacturing a hearing device with improved security. The hearing device disclosed herein advantageously verifying integrity of received data, detecting any alteration and disregard altered data for e.g. maintenance, fitting session, and/or remote tuning. The disclosed hearing device and method for manufacturing the hearing device supports a hearing device in combating attacks such as unauthorized access or control of a hearing device, while still allowing access to legitimate parties such as the client device, for e.g. fitting purposes, update purposes, maintenance purposes. The hearing device disclosed herein has the advantage to open a session only with authenticated parties, such as an authenticated fitting device, an authenticated accessory device, an authenticated external devices and/or an authenticated server. This may provide robustness against impersonation and masquerading attacks, battery exhaustion attacks, eavesdropping, man-in-the-middle attacks and/or replay attacks. Further, the need for updating and/or exchange of keys in case a key has been compromised at a client device has been reduced and simplified. Further, advantageously, the hearing device keys are unique for the hearing device, making it virtually impossible to derive a client device key from the hearing device keys.

A hearing device includes: a processing unit configured to compensate for hearing loss of a user of the hearing device; a memory unit; and an interface; wherein the memory unit has a hearing device certificate stored therein, the hearing device certificate comprising: a hearing device identifier, a plurality of hearing device keys, at least one hearing device key identifier indicative of one of the hearing device keys.

Optionally, the plurality of hearing device keys comprises a first set of hearing device keys including a first primary hearing device key, and wherein the at least one hearing device key identifier comprises a first hearing device key identifier indicative of one of the hearing device keys in the first set.

Optionally, the plurality of hearing device keys comprises a second set of hearing device keys including a second primary hearing device key, and wherein the at least one hearing device key identifier comprises a second hearing device key identifier indicative of one of the hearing device keys in the second set.

Optionally, the hearing device certificate comprises a certificate type identifier, a signing device identifier, one or more hardware identifiers, a client device type authorization identifier, a token parameter, or any combination of the foregoing.

Optionally, the hearing device certificate comprises a hardware platform identifier, a software platform identifier, and/or a certificate timestamp.

Optionally, the hearing device certificate comprises a digital signature and/or a message authentication code.

A method of manufacturing a hearing device comprising a processing unit configured to compensate for hearing loss of a user of the hearing device, a memory unit, and an interface, includes: generating a hearing device identifier; generating one or more hearing device keys based on the hearing device identifier; generating a hearing device certificate including the hearing device identifier and at least one of the one or more hearing device keys; and transmitting the hearing device certificate to the hearing device.

Optionally, the method further includes obtaining one or more client device keys including a first client device key, and wherein the act of generating the one or more hearing device keys is based on the first client device key.

Optionally, the act of generating the one or more hearing device keys comprises generating a first set of hearing device keys including a first primary hearing device key; wherein the method further comprises obtaining a first hearing device key identifier indicative of one of the hearing device keys in the first set; and wherein the act of generating the hearing device certificate comprises including the first set of hearing device keys and the first hearing device key identifier in the hearing device certificate.

Optionally, the act of generating the hearing device certificate comprises generating a digital signature, and including the digital signature in the hearing device certificate.

Other features, advantageous, and/or embodiments will be described below in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
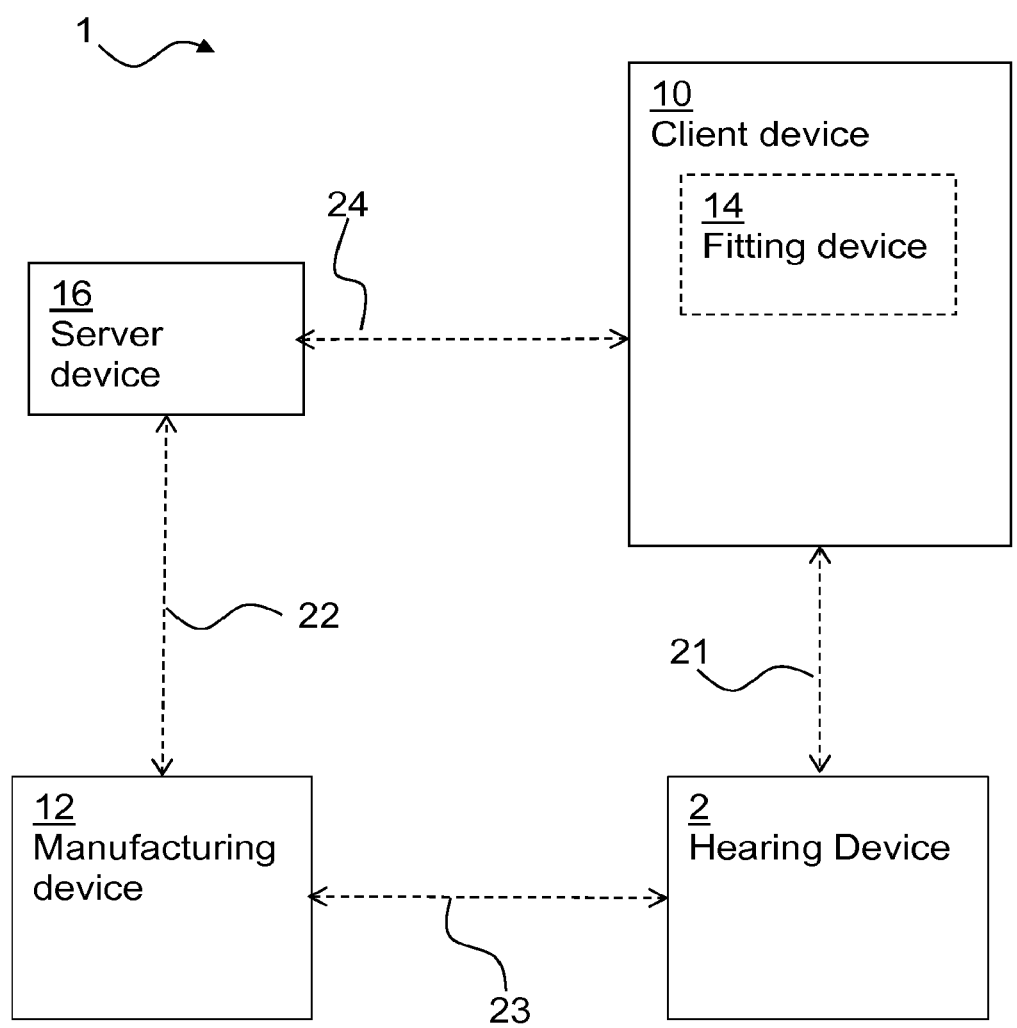
FIG. 1 schematically illustrates an exemplary architecture according to this disclosure, FIG. 2 schematically illustrates an exemplary hearing device, FIG. 3 schematically illustrates an exemplary hearing device certificate, FIG. 4 schematically illustrates an exemplary signalling diagram, and FIG. 5 schematically illustrates a flowchart of an exemplary method.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

It is an object of the present disclosure to provide a hearing device, and a method of manufacturing a hearing device which seeks to mitigate, alleviate, or eliminate one or more of the above-identified deficiencies in the art and disadvantages singly or in any combination.

The present disclosure relates to improved security of a hearing device. Namely, the hearing device disclosed herein is robust against security threats, vulnerabilities and attacks by implementing appropriate safeguards and countermeasures, such as security mechanisms, to protect against threats and attacks. The present disclosure relates to a hearing device that is robust against replay attacks, unauthorized access, battery exhaustion attacks, and man-in-the-middle attacks.

As used herein, the term "hearing device" refers to a device configured to assist a user in hearing a sound, such as a hearing instrument, a hearing aid device, a headset, a pair of headphones, etc.

As used herein, the term "certificate" refers to a data structure that enables verification of its origin and content, such as verifying the legitimacy and/or authenticity of its origin and content. The certificate is configured to provide a content that is associated to a holder of the certificate by an issuer of the certificate. The certificate optionally comprises keying material, such as one or more cryptographic keys (e.g. a hearing device key), and/or a digital signature, so that a recipient of the certificate is able to verify or authenticate the certificate content and origin. The certificate permits thus to achieve authentication of origin and content, non-repudiation, and/or integrity protection. The certificate may further comprise a validity period, one or more algorithm parameters, and/or an issuer. A certificate may comprise a digital certificate, a public key certificate, an attribute certificate, and/or an authorization certificate. Examples of certificates are X.509 certificates, and Secure/Multipurpose Internet Mail Extensions, S/MIME, certificates, and/or Transport Layer Security, TLS, certificates.

As used herein, the term "key" refers to a cryptographic key, i.e. a piece of data, (e.g. a string, a parameter) that determines a functional output of a cryptographic algorithm. For example, during encryption, the key allows a transformation of a plaintext into a cipher-text and vice versa during decryption. The key may also be used to verify a digital signature and/or a message authentication code, MAC. A key is so called a symmetric key when the same key is used for both encryption and decryption. In asymmetric cryptography or public key cryptography, a keying material is a key pair, so called a private-public key pair comprising a public key and a private key. In an asymmetric or public key cryptosystem (such as Rivest Shamir Adelman, RSA, cryptosystem or Elliptic curve cryptography, ECC), the public key is used for encryption and/or signature verification while the private key is used for decryption and/or signature generation. The hearing device key(s) may be keying material allowing derivation of one or more symmetric keys, such as a session key and/or a certificate key for hearing device communication. The hearing device key(s) may be comprised in the hearing device certificate and may be stored in a memory unit of the hearing device, e.g. during manufacture. The hearing device key may comprise keying material that is used to derive a symmetric key. The hearing device key comprises for example an Advanced Encryption Standard, AES, key, such as an AES-128 bits key.

The present disclosure relates to a hearing device. The hearing device comprises a processing unit, a memory unit and an interface. The memory unit may include removable and non-removable data storage units including, but not limited to, Read Only Memory (ROM), Random Access Memory (RAM), etc. The hearing device may comprise a processing unit configured to compensate for hearing loss of a user of the hearing device. The interface may comprise a wireless transceiver, e.g. configured for wireless communication at frequencies in the range from 2.4 to 2.5 GHz. In one or more exemplary hearing devices, the interface is configured for communication, such as wireless communication, with a client device or a hearing device, respectively comprising a wireless transceiver configured to receive and/or transmit data. The processing unit may be configured to compensate for hearing loss of a user of the hearing device according to the received data. The hearing device may be configured to receive a hearing device certificate via the interface and/or to allow a manufacturing device to access the memory unit for writing the hearing device certificate. The memory unit has a hearing device certificate stored thereon. The memory unit may have the hearing device certificate stored at a memory address of the memory unit, and/or in memory cells of the memory unit, such as in designated memory cells and/or at designated addresses.

The hearing device certificate may comprise a hearing device identifier. The hearing device certificate may comprise at least one hearing device key identifier indicative of a hearing device key. The hearing device certificate may comprise one or a plurality of hearing device keys. The hearing device identifier may refer to a unique identifier of the hearing device. As used herein the term "identifier" refers to a piece of data that is used for identifying, such as for categorizing, and/or uniquely identifying. The identifier may be in a form of a word, a number, a letter, a symbol, a list, an array or any combination thereof. For example, the identifier as a number may be in the form of an integer, such as unsigned integer, unit, with a length of e.g. 8 bits, 16 bits, 32 bits, etc., such as an array of unsigned integers. The hearing device key identifier may indicate the hearing device key to be used as keying material for securing a communication with an external party, such as with a client device. The hearing device key identifier may indicate which hearing device keys are part of the hearing device certificate. For example, a first hearing device key identifier having the value of "5" indicates that the hearing device certificate includes a first hearing device key with identifier "5", and optionally increments of the identifier, such as hearing device keys with identifiers "6", "7", "8" etc. depending on the number of hearing device keys in the certificate. For example, a hearing device key identifier points to and/or identifies a hearing device key amongst the plurality of the hearing device keys.

The term "client device" as used herein refers to a device that is able to communicate with the hearing device. The client device may refer to a computing device acting as a client. The client device may comprise a fitting device, a handheld device, a relay, a tablet, a personal computer, a mobile phone, an application running on a personal computer or tablet, or mobile phone and/or USB dongle plugged into a personal computer. The client device may be attributed a client device type corresponding to a model, category or type of client devices, such as a fitting type, e.g. a tablet product model, category or type for fitting the hearing device, a USB dongle product model, category or type for fitting the hearing device. The client device may control operation of the hearing device, either by sending fitting data, hearing device operating parameters, and/or firmware data.

The hearing device certificate comprises one or more hearing device keys, such as a plurality of hearing device keys. The plurality of hearing device keys may comprise one or more sets of hearing device keys, such as a first set and/or a second set of hearing device keys. A set of hearing device keys comprises one or more hearing device keys including a primary hearing device key. A set of hearing device keys may comprise a secondary hearing device key, a tertiary hearing device key and/or a quaternary hearing device key. A set of hearing device keys, such as the first set and/or the second set may comprise or consist of a number of different hearing device keys. The number of hearing device keys in a set of hearing device keys may be at least three, such as in the range from three to ten. A set of hearing device keys consisting of three to six hearing device keys may be advantageous given the limited memory size and the desire to provide enough hearing device keys for enabling future operation of the hearing device without requiring a tedious and time-consuming update of the hearing device certificate.

A plurality of hearing device keys enables the hearing device to communicate securely with a plurality of client devices using different client device keys. Alternatively or in addition, the hearing device may switch to another hearing device key, e.g. from primary hearing device key to second hearing device key, for example if a client device configured to communicate according to the hearing device key currently used has been compromised. In one or more exemplary hearing devices, the plurality of hearing device keys comprises a first set of hearing device keys including a first primary hearing device key. The at least one hearing device key identifier comprises a first hearing device key identifier indicative of a hearing device key of the first set of hearing device keys. The first set of hearing device keys may comprise a set of hearing device keys, e.g. three or four hearing device keys, dedicated to securing communication to and from a first client device, such as a first client device type. For example, the first set of hearing device key may be a set of hearing device keys for securing communication of hearing device data with a first client device.

Hearing device data comprises e.g. firmware, fitting data, and/or hearing device operating parameters. Fitting data may for example be data generated by a fitting device used by a dispenser when a hearing device is being fitted in a user's ear. Fitting data may comprise hearing loss parameters, compressor parameters, filter coefficients, and/or gain coefficients. Hearing device operation parameters may comprise volume control parameters, mode and/or program control parameters. Firmware may refer to a computer program provided by the hearing device manufacturer, and to be installed on the hearing device to control the hearing device. Firmware is for example to be installed to upgrade the operations and capabilities of the hearing device and/or to fix bugs in the older firmware.

The plurality of hearing device keys may comprise a second set of hearing device keys including a second primary hearing device key. The at least one hearing device key identifier may comprise a second hearing device key identifier indicative of a hearing device key of the second set of hearing device keys. The hearing device is configured to communicate with one or more client devices, such as a first client device and/or a second client device. For each client device or client device type that the hearing device is configured to communicate with, the certificate may comprise a set of hearing device keys configured to enable secure communication with each of the client devices or the client device type, and one or more hearing device key identifiers each hearing device key identifier being indicating which hearing device keys are part of the hearing device certificate. The hearing device may be configured to select a hearing device key from a selected set of hearing device keys based on the client device or the client device type connected to the hearing device and the hearing device key identifier associated with the corresponding set of hearing device keys.

The hearing device certificate may comprise a certificate type identifier. The certificate type identifier may indicate a type of the certificate amongst a variety of certificate types, such as a hearing device family certificate type, a hearing device certificate type, a firmware certificate type, a research and development certificate type, client device certificate type. The certificate type identifier may be used by the hearing device to identify what type of certificate the hearing device receives, stores, authenticates and/or retrieves. The hearing device certificate may comprise a version identifier indicative of a data format version of the certificate. The hearing device may use the certificate type identifier and/or the version identifier to determine what type of data the certificate comprises and/or what type of data is comprised in a field of the certificate. For example, the hearing device may determine based on the certificate type identifier and/or version identifier what field of the certificate comprises a digital signature and/or which public key is needed to verify the digital signature of the certificate. It may be envisaged that there is a one-to-one mapping between the certificate type identifier and the public-private key pair.

The hearing device certificate may comprise a signing device identifier. The signing device identifier refers to a unique identifier identifying the device that has signed the hearing device certificate, such as a manufacturing device, e.g. an integrated circuit card, a smart card, a hardware security module. The signing device identifier may for example comprise a medium access control, MAC, address of the signing device and/or a serial number of the signing device. The signing device identifier may allow for example the hearing device to determine whether the signing device is e.g. black-listed or not, and thus to reject certificates signed by a signing device that has been black-listed, e.g. due to theft or other corruption.

The hearing device certificate may comprise one or more hardware identifiers, for example a first hardware identifier and/or a second hardware identifier. A hardware identifier may identify a piece of hardware comprised in the hearing device, such as a radio chip comprised in the hearing device and/or a digital signal processor of the hearing device. The hardware identifier(s) may be stored in a register of the piece of hardware comprised in the hearing device during manufacturing of the piece of hardware. The hardware identifier may comprise a serial number of the hardware, a chip identifier, or any combination thereof. The hearing device receiving or retrieving from the memory unit the hearing device certificate comprising the hardware identifier may verify the hearing device certificate by comparing its stored hardware identifier and the corresponding hardware identifier comprised in the hearing device certificate. Such verification may be performed upon reception of the hearing device certificate, and/or upon retrieval of the hearing device certificate from the memory unit, such as at boot or power-on of the hearing device.

The hearing device certificate may comprise one or more client device type authorization identifiers. A client device type may comprise a model, category or type of client devices, such as a tablet product model, category or type, a USB dongle product model, category or type. A client device type authorization identifier is an identifier of an authorized client device type, such as an identifier of the client device types that the hearing device may authorize or accept for communication, such as for fitting. For example, the client device type authorization identifier is in one or more hearing devices a bit-field indicative of the type(s) of client device the hearing device should allow for fitting.

The hearing device certificate may comprise a token parameter. The token parameter may indicate whether a token-based authentication between the hearing device and a client device is to be enabled or not. For example, if the token parameter is set to 0, token-based authentication of client devices is not to be enabled by the hearing device and the hearing device is to use for example a combination of client device type identifier and/or a client device identifier (such as a serial number) to perform an authentication of the client device. If for example the token parameter is set to 1, token-based authentication of client devices is to be enabled by the hearing device, i.e. the hearing device authenticates the client device based on a token received from the client device. The hearing device may also derive a session-specific token based on the received token parameter which is used to e.g. accept the connection to the client device without user intervention.

The hearing device certificate may comprise one or more of a hardware platform identifier, a software platform identifier, and/or a certificate timestamp. The hardware platform identifier may identify a hardware platform, such as an operational hearing device hardware platform, i.e. a hardware platform compatible with the hearing device certificate. The software platform identifier may identify one or a family of software platforms on which the hearing device certificate is configured to operate. The certificate timestamp refers to a timestamp of production or manufacture of the hearing device certificate, such as a timestamp of the manufacturing device indicating a time instant when the hearing device certificate is generated. The certificate timestamp may be in form of e.g.: hour, min, date, month, year. The hearing device may subsequently perform version control and revocation using the hardware platform identifier, the software platform identifier, and/or the certificate timestamp.

The hearing device certificate may comprise a digital signature. The digital signature enables a proof or verification of authenticity of the hearing device certificate, such as verification of the signer legitimacy. The digital signature is optionally generated by the manufacturing device using a device family private key upon manufacturing of the hearing device. The hearing device may be configured to verify the digital signature when receiving the hearing device certificate comprising the digital signature. The digital signature is verifiable by the hearing device using a corresponding device family public key. If the digital signature is not successfully verified using the alleged public key, the hearing device may disregard the certificate and/or abort normal operation. This may provide the advantage that the hearing device rejects a hearing device certificate that is tampered or received from unauthenticated parties. The communication with the hearing device may thus be robust against impersonation, modification and masquerading attacks.

The hearing device certificate may comprise a message authentication code. A message authentication code, MAC, may be generated by a manufacturing device, e.g. based on the content of the hearing device certificate and a key. Upon reception of the hearing device certificate comprising the MAC, the hearing device which holds the stored key is able to re-compute the MAC based on the received hearing device certificate and a MAC generation function and compare the recomputed MAC with the received MAC. If the recomputed MAC does not match the received MAC, then the hearing device concludes that hearing device certificate is corrupted. The hearing device may disregard the certificate and/or abort normal operation if integrity of the hearing device certificate is corrupted. For example, if it is determined that the hearing device certificate has been tampered with or modified (by e.g. insertion, deletion and/or substitution) by an unauthorized party, disregarding the hearing device certificate may comprise rejecting the received hearing device certificate, and denying access to e.g. an external device.

The present disclosure relates to a method of manufacturing a hearing device. The hearing device comprises a processing unit optionally configured to compensate for hearing loss of a user of the hearing device, a memory unit, and an interface. The method comprises generating a hearing device identifier. Generating the hearing device identifier may comprise generating a random or pseudo-random number. Generating the hearing device identifier may be based on one or more hardware identifiers.

The method may comprise generating one or more hearing device keys based on the hearing device identifier. The method comprises generating a hearing device certificate including the hearing device identifier and at least one of the generated hearing device keys; and transmitting the hearing device certificate to the hearing device. The method may be performed by a manufacturing device. The manufacturing device refers to a device configured to contribute to the manufacturing of the hearing device. Examples of manufacturing devices comprise a personal computer, a mobile phone, an application running on a personal computer, or mobile phone, a hardware security module (HSM) associated with a personal computer and/or USB dongle plugged into a personal computer. Transmitting the hearing device certificate may comprise storing the hearing device certificate in the memory unit of the hearing device, such as writing the hearing device certificate in the memory unit of the hearing device. The memory unit may have the hearing device certificate stored thereon.

In one or more exemplary methods, the method comprises obtaining one or more client device keys including a first client device key and/or a second client device key, and generating one or more hearing device keys is based on the first client device key and/or the second client device key. The first client device key may be a first client device base key, such as an AES base key dedicated to securing communication with the first client device or client device type. The manufacturing device may generate/obtain the first client device key. The manufacturing device may generate one or more hearing device keys based on the first client device key, e.g. by using a hash function. For example, a first hearing device key {HD_KEY_1} for communication with the first client device may be generated as follows:

HD_KEY_1=hash(HD_ID, CD_KEY_1), where hash is a hash function, HD_ID is the hearing device identifier and CD_KEY_1 is the first client device key. This may also applicable to a second hearing device key based on a second client device key and/or to a first secondary hearing device key based on a first secondary client device key. The hearing device may be configured to use one of the hearing device keys as keying material to derive one or more keys, such as a certificate key and/or a session key, for securing (such as to encrypt, authenticate, verify) communication with a client device. Encryption of data may be performed using e.g. an encryption scheme. The encryption scheme may comprise a symmetric encryption scheme and/or an asymmetric encryption scheme. Examples of encryption schemes include Advanced Encryption Standard, AES, RSA crypto-system, Elliptic curve cryptography, ECC, and Triple Data Encryption Algorithm. The use of a symmetric key provides the advantage of being able to use hardware accelerators, and thus providing lightweight encryption.

In one or more exemplary methods, generating one or more hearing device keys comprises generating a first set of hearing device keys including a first primary hearing device key and/or a first secondary hearing device key. A set of hearing device keys may comprise one or more hearing device keys, such as a primary hearing device key, a secondary hearing device key, etc . . . . A single key may constitute a set of hearing device keys. The first set of hearing device keys comprises for example a set of keys dedicated to securing communication to and from a first client device or first client device type. For example, a first set HD_KEY_A of hearing device keys may be generated as follows, where the first set of hearing device keys HD_KEY_A={HD_KEY_1_1, HD_KEY_1_2, HD_KEY_1_3, HD_KEY_1_4}:

HD_KEY_1_X=hash(HD_ID, CD_KEY_1_X), where hash is a hash function, X is an index identifying respective hearing device keys to be produced for the first set (e.g. X={1, 2, 3, 4} for first primary hearing device key (HD_KEY_1_1), first secondary hearing device key (HD_KEY_1_2), first tertiary hearing device key (HD_KEY_1_3), first quaternary hearing device key (HD_KEY_1_4)), HD_ID is the hearing device identifier and CD_KEY_1_X is the X'th first client device key. This is also applicable to a second set of hearing device keys based on second client device key(s).

The method may comprise obtaining a first hearing device key identifier indicative of a (first) hearing device key of the first set of hearing device keys. Obtaining the first hearing device key identifier may comprise generating the first hearing device key identifier, such as setting the first hearing device key identifier to a value indicative of which hearing device key(s) are comprised in the hearing device certificate. Generating the hearing device certificate may comprise including the first set of hearing device keys and the first hearing device key identifier in the hearing device certificate.

In one or more exemplary methods, generating one or more hearing device keys comprises generating a second set of hearing device keys including a second primary hearing device key and/or a second secondary hearing device key. The method may comprise obtaining a second hearing device key identifier indicative of a (second) hearing device key, such as the second primary hearing device key of the second set of hearing device keys. Generating the hearing device certificate may comprise including the second set of hearing device keys and the second hearing device key identifier in the hearing device certificate.

In one or more exemplary methods, generating the hearing device certificate comprises generating a digital signature and including the digital signature in the certificate. Generating a digital signature involves e.g. a private-public key pair and a signature generation function. Examples of signature generation and verification systems include RSA cryptosystem. The RSA cryptosystem is based on a modulus N that is the product of two large primes, and integers e and d such that $e \cdot d \equiv 1 \pmod{\varphi(N)}$, where $\varphi$ is the Euler phi-function. An RSA public key comprises the modulus N and e as public exponent, and the corresponding RSA private key comprises the modulus N and d as private exponent. For example, generating a digital signature $\sigma$ to append to a hashed message m comprises computing the digital signature $\sigma$ in e.g. the following way: $\sigma \equiv m^d \pmod{N}$.

Verifying a digital signature comprises computing $\sigma^e$ and comparing it to the received message m (mod N). The digital signature $\sigma$ is verified as valid, or the verification is successful when the digital signature raised to the power of the public exponent is identical to the received message: $\sigma^e \equiv m \pmod{N}$.

The method may comprise obtaining one or more hardware identifiers, such as a first hardware identifier and/or a second hardware identifier, of the hearing device. Obtaining hardware identifier(s) of the hearing device may comprise receiving the hardware identifier(s) of the hearing device, and/or retrieving the hardware identifier(s) of the hearing device from a data storage. The hearing device or the manufacturing device may retrieve or read the hardware identifier(s) from the memory unit, such as from a register. The hearing device may transmit the hardware identifier to the manufacturing device. The hardware identifier(s) may comprise a serial number, a medium access control, MAC, address, a chip identifier, or any combination thereof. Generating the hearing device certificate may comprise including the first hardware identifier and/or second hardware identifier in the hearing device certificate. The first hardware identifier may be a serial number of a hardware module. The manufacturing device may be configured to include the first hardware identifier in the hearing device certificate. The hearing device receiving the hearing device certificate including the first hardware identifier may be configured to verify the hearing device certificate by comparing its stored first hardware identifier and the first hardware identifier included in the hearing device certificate.

In one or more exemplary methods, generating the hearing device certificate may comprise including one or more of a certificate type identifier, a signing device identifier, one or more hardware identifiers, a client device type authorization identifier, and/or a token parameter in the hearing device certificate. The hearing device may use the certificate type identifier, the client device type authorization identifier, and/or the token parameter in the hearing device certificate to control and authorize client devices to access the hearing device. The hearing device may use the signing device identifier to authenticate the hearing device certificate. The hearing device may use the hardware identifier to verify that the hearing device certificate is indeed intended for the hearing device.

In one or more exemplary methods, generating the hearing device certificate comprises including a hardware platform identifier, a software platform identifier, and/or a certificate timestamp in the hearing device certificate. The hearing device may use the hardware platform identifier, the software platform identifier, and/or the certificate timestamp in the hearing device certificate to verify compatibility with a hardware, or a firmware of the hearing device, and to perform revocation.

FIG. 1 schematically illustrates exemplary devices that may be used for manufacturing, maintenance, and/or operating a hearing device 2. FIG. 1 shows an exemplary system 1 and a hearing device 2. The system 1 may comprise one or more of a manufacturing device 12, a client device 10, and a server device 16 for manufacturing, maintenance, and/or operating the hearing device 2 in connection with hearing loss compensation (such as for fitting the hearing device, for updating a hearing device parameter).

The manufacturing device 12 may be configured to perform any steps of the method of manufacturing a hearing device 2 disclosed herein. The manufacturing device 12 may be configured to generate a hearing device identifier, to generate one or more hearing device keys based on the hearing device identifier; to generate a hearing device certificate including the hearing device identifier and at least one of the generated hearing device keys. The manufacturing device 12 may be configured to transmit the hearing device certificate to the hearing device. The manufacturing device 12 may comprise processing elements (such as a processor and a memory) configured to perform any of the steps of the method of manufacturing a hearing device disclosed herein.

The hearing device 2 may be configured to compensate for hearing loss of a user of the hearing device 2. The hearing device 2 may be configured to communicate with the manufacturing device 12 using e.g. a communication link 23, such as a uni or bidirectional communication link. The communication link 23 may be a wired link and/or wireless communication link. The communication link 23 may be a single hop communication link or a multi-hop communication link. The wireless communication link may be carried over a short-range communication system, such as Bluetooth, Bluetooth low energy, IEEE 802.11, Zigbee. The hearing device 2 may be configured to receive a hearing device certificate from the manufacturing device 12 and to store the hearing device certificate in a memory unit comprised in the hearing device 2. Alternatively or additionally, the manufacturing device 12 may store the hearing device certificate in the memory unit of the hearing device. For example, the manufacturing device 12 may write the hearing device certificate in the memory unit. The memory unit may have stored thereon the hearing device certificate. The hearing device certificate may comprise a hearing device identifier, at least one hearing device key identifier indicative of a hearing device key and one or a plurality of hearing device keys. For example, during manufacturing of the hearing device 2, the manufacturing device 12 connects to the hearing device 2 and transmits the hearing device certificate to the hearing device 2. The hearing device may receive and store the hearing device certificate. The hearing device 2 may then use the material provided in the hearing device certificate to secure communications with client devices when needed.

The hearing device 2 may be configured to connect to the client device 10 via a communication link 21, such as a bidirectional communication link. The communication link 21 may be a wired link and/or wireless communication link. The communication link 21 may be a single hop communication link or a multi hop communication link. The wireless communication link may be carried over a short-range communication system, such as Bluetooth, Bluetooth low energy, IEEE 802.11, Zigbee. The hearing device 2 may configured to connect to the client device 10 over a network. The client device 10 may permit remote fitting of the hearing aid device where a dispenser connects to the hearing device via the client device 10 of the user. The client device 10 may comprise a computing device acting as a client, such as a fitting device 14 (e.g. a handheld device, a relay, a tablet, a personal computer, a mobile phone, and/or USB dongle plugged in a personal computer). The client device 10 may be configured to communicate with the server device 16 via a communication link 24, such as a bidirectional communication link. The communication link 24 may be a wired link and/or wireless communication link. The communication link 24 may comprise a network, such as the Internet. The client device 10 may be configured to communicate with the server device 16 for maintenance, and update purposes. The server device 16 may comprise a computing device configured to act as a server, i.e. to serve requests from the client device 10 and/or from the hearing device 2. The server device 16 may be controlled by the hearing device manufacturer. The server device 16 may be configured to communicate with the manufacturing device 12 via a communication link 22 for manufacturing maintenance, and/or operational purposes. The server device 16 and the manufacturing device 12 may be co-located and/or form one entity for manufacturing maintenance, and/or operational purposes of the hearing device 2.

Figure 2:
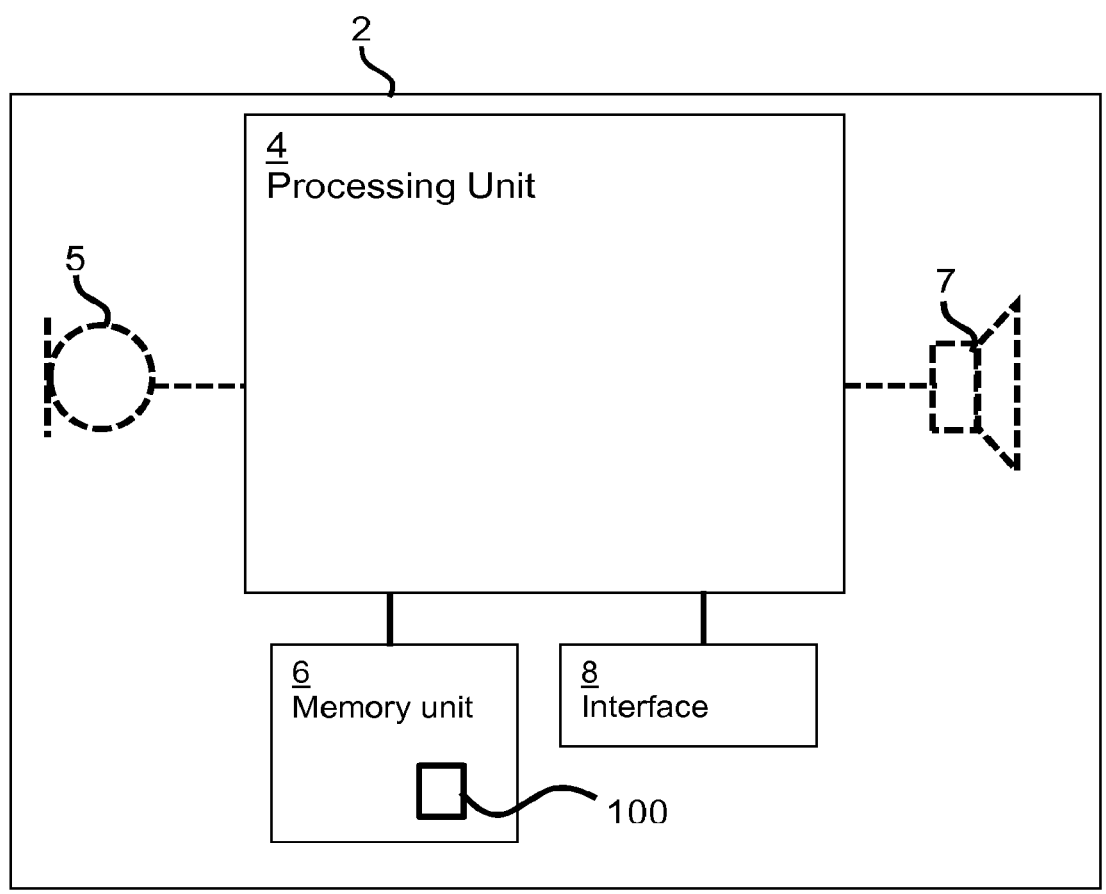

FIG. 2 schematically illustrates an exemplary hearing device 2. The hearing device 2 comprises a processing unit 4, a memory unit 6 and an interface 8. The hearing device 2 comprises a processing unit 4 configured to compensate for hearing loss of a user of the hearing device 2. The interface 8 comprises a wireless transceiver, e.g. configured for wireless communication at frequencies in the range from 2.4 to 2.5 GHz. The interface 8 is configured for communication, such as wired and/or wireless communication, with a manufacturing device 12. The processing unit 4 may be configured to compensate for hearing loss of a user of the hearing aid according to data received during manufacture. The hearing device 2 comprises a microphone 5 or a plurality of microphones for receiving sound signal(s) and converting sound signal(s) into converted sound signal. The converted sound signal may be an electrical and/or digital version of the sound signal. The processing unit 4 is configured to receive and process the converted sound signal into a processed sound signal according to a hearing loss of a user of the hearing device 2. The processed sound signal may be compressed and/or amplified or the like. The hearing device 2 comprises an output transducer/loudspeaker 7, known as a receiver. The receiver 7 is configured to receive the processed sound signal and convert it to an output sound signal for reception by an eardrum of the user.

The hearing device 2 may be configured to receive a hearing device certificate 100, e.g. via the interface 8. The hearing device 2 may be configured to store the hearing device certificate, e.g. in the memory unit 6. The hearing device 2 may also grant access to the manufacturing device 12 which then stores or writes the hearing device certificate in the memory unit 6. The memory unit 6 may include removable and non-removable data storage units including, but not limited to, Read Only Memory (ROM), Random Access Memory (RAM), etc. The memory unit 6 may have the hearing device certificate stored thereon. The hearing device certificate may comprise a hearing device identifier, at least one hearing device key identifier indicative of a hearing device key and a plurality of hearing device keys. The memory unit 6 may have the hearing device certificate 100 stored at a memory address of the memory unit 6. The memory unit 6 may have stored e.g. the hearing device identifier, the at least one hearing device key identifier, the plurality of hearing device keys, and/or any data comprised in the hearing device certificate at distinct respective memory addresses of the memory unit 6. The hearing device 2 may retrieve the hearing device identifier, the at least one hearing device key identifier, the plurality of hearing device keys, and/or any data comprised in the hearing device certificate from the distinct respective memory addresses of the memory unit 6. The hearing device 2 may use the hearing device certificate or at least part(s) thereof to secure communication with external entities, such as the client device, the server device, another hearing device.

Figure 3:
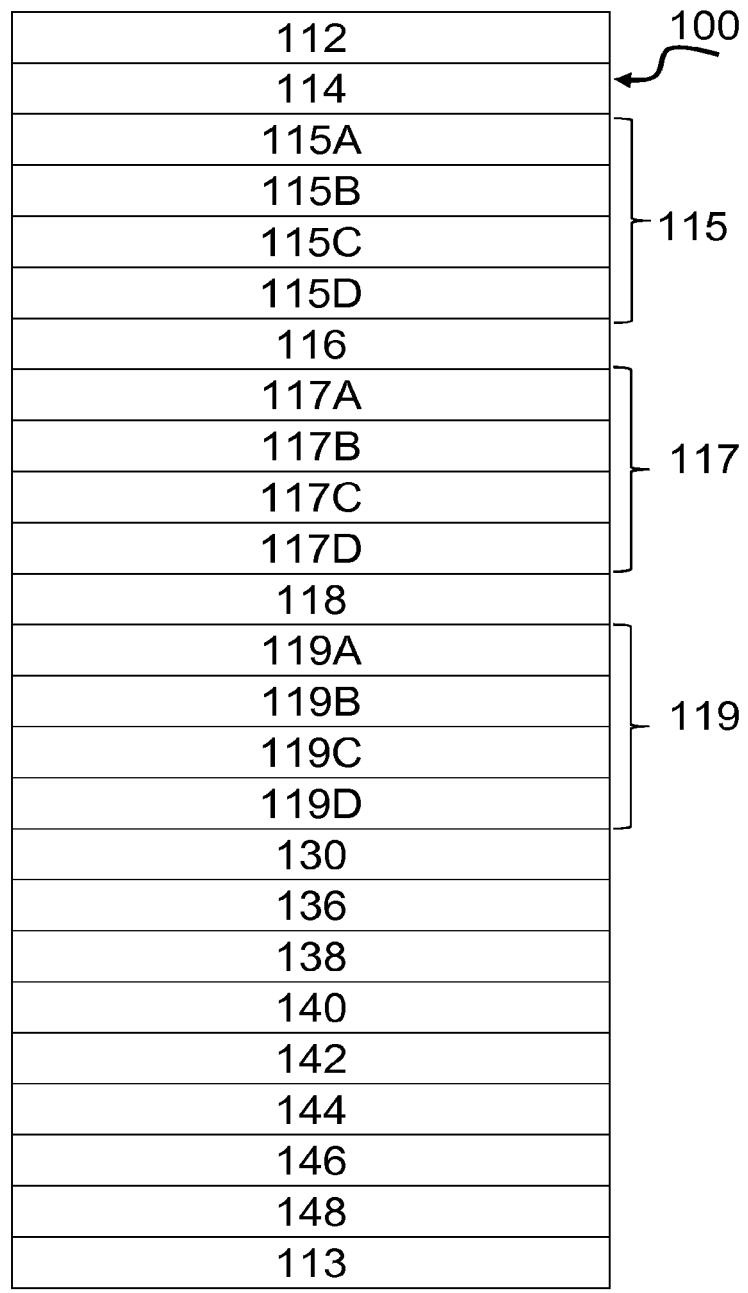

FIG. 3 schematically illustrates an exemplary hearing device certificate 100. The hearing device certificate 100 comprises a hearing device identifier 112, at least one hearing device key identifier including a first hearing device key identifier 114 indicative of a hearing device key and one or a plurality of hearing device keys. The hearing device identifier 112 may refer to a unique or a pseudo-unique identifier. The first hearing device key identifier 114 is indicative of the first hearing device key(s) of the hearing device certificate. For example, the first hearing device key identifier 114 may be indicative of or point to a hearing device key of a first set 115 of hearing device keys (115A, 115B, 115C, 115D) of the hearing device certificate, e.g. the first primary hearing device key 115A.

The hearing device certificate 100 optionally comprises two, three or at least four sets of hearing device keys enabling secure communication with a corresponding number of different client devices/client device types.

The hearing device certificate 100 comprises a first set 115 of hearing device keys including a first primary hearing device key 115A. The at least one hearing device key identifier comprises a first hearing device key identifier 114 indicative of a hearing device key of the first set 115 of hearing device keys 115A, 115B, 115C, 115D. The first set 115 of hearing device keys comprises for example first primary key 115A, first secondary key 115B, first tertiary key 115C, and first quaternary key 115D dedicated to securing communication to and from a first client device or a first client device type. For example, the first set 115 of hearing devices key may be a set of hearing device keys 115A, 115B, 115C, 115D for securing communication of hearing device data with the first client device.

The plurality of hearing device keys may comprise a second set 117 of hearing device keys including a second primary hearing device key 117A, a second secondary hearing device key 117B, a second tertiary hearing device key 117C, and/or a second quaternary hearing device key 117D. The at least one hearing device key identifier comprises a second hearing device key identifier 116 indicative of a hearing device key of the second set 117 of hearing device keys 117A, 117B, 117C, 117D. The hearing device is configured to communicate with one or more client devices, such as a first client device and/or a second client device. For each client device or client device type that the hearing device is configured to communicate with, the hearing device certificate comprises a set of hearing device keys configured to enable secure communication with a specific client device or client device type and a hearing device key identifier indicating which hearing device keys that are part of the hearing device certificate. The hearing device certificate may comprise a third set 119 of hearing device keys including a third primary hearing device key 119A, a third secondary hearing device key 119B, a third tertiary hearing device key 119C, and/or a third quaternary hearing device key 119D. The at least one hearing device key identifier comprises a third hearing device key identifier 118 indicative of a hearing device key of the third set 119 of hearing device keys. The hearing device certificate 100 may comprise a fourth set of hearing device keys including a fourth primary hearing device key (not shown). The at least one hearing device key identifier comprises a fourth hearing device key identifier indicative of a hearing device key of the fourth set of hearing device keys. The hearing device 2 may be configured to select a set of hearing device keys based on the client device or the client device type connected to the hearing device and to select a hearing device key from the set of hearing device keys selected based on the hearing device key identifier associated with the selected set of hearing devices.

The hearing device certificate 100 comprises a certificate type identifier 130. The certificate type identifier 130 indicates that the hearing device certificate 100 is a hearing device certificate, e.g. selected amongst a variety of certificate types, such as a hearing device family certificate type, a hearing device certificate type, a firmware certificate type, a research and development certificate type, and a client device certificate type. The certificate type identifier 130 may be used to enable the hearing device 2 to identify what type of certificate it receives, stores, authenticates and/or retrieves. The hearing device certificate 100 may comprise a version identifier which indicates a data format version of the hearing device certificate. The hearing device 2 may use the certificate type identifier 130 and/or the version identifier to determine what type of data the hearing device certificate 100 comprises, what type of data is comprised in a field of the hearing device certificate 100. For example, the hearing device 2 may determine based on the certificate type identifier 130 and/or version identifier what field of the certificate comprises a digital signature 113, and which public key is needed to verify the digital signature 113. It may be envisaged that there is a one-to-one mapping between the certificate type identifier 130 and the public-private key pair used for generating the digital signature 113. The hearing device certificate 100 may comprise a length identifier that indicates the length of the hearing device certificate 100, e.g. in bits, bytes.

The hearing device certificate 100 optionally comprises a signing device identifier 136. The signing device identifier 136 refers to a unique identifier identifying the device (such as a manufacturing device 12, e.g. an integrated circuit card, a smart card, a hardware security module comprised in a manufacturing device 12) that has signed the hearing device certificate 100. The signing device identifier 136 may for example comprise a medium access control, MAC, address of the signing device, a serial number. The signing device identifier 136 allows for example the hearing device 2 to determine whether the signing device is e.g. black-listed or not, and thus to reject hearing device certificates 100 signed by a signing device that is black-listed.

The hearing device certificate 100 optionally comprises one or more hardware identifiers including a first hardware identifier 148 and/or a second hardware identifier (not shown). The hardware identifier 148 may identify a piece of hardware comprised in the hearing device 2, such as a processing unit 4, a radio chip comprised in the hearing device 2, a digital signal processor of the hearing device 2. The first hardware identifier 148 may also be stored in a register of the piece of hardware comprised in the hearing device 2 during manufacturing of the piece of hardware. The first hardware identifier 148 may comprise a serial number, a medium access control, MAC, address, a chip identifier, or any combination thereof. The hearing device certificate 100 may comprise a first hardware identifier 148, a second hardware identifier and/or a third hardware identifier. For example, the first hardware identifier 148 may provide a first hearing device specific value present in a register of a hardware module (e.g. the processing unit or the radio chip) of the hearing device 2 while the second hardware identifier may provide a second hearing device specific value present in a register of a hardware module of the hearing device 2, and a third hardware identifier may provide a third hardware module identifier (e.g. a processing unit identifier, a DSP identifier). The hearing device 2, upon receiving the hearing device certificate 100 comprising the first hardware identifier 148, may then verify the hearing device certificate 100 by comparing its stored hardware identifier and the first hardware identifier 148 comprised in the hearing device certificate 100 received. This way, the hearing device 2 may determine if the received hearing device certificate is intended for the hearing device 2 and reject the received hearing device certificate if the stored and received hardware identifiers do not match.

The hearing device certificate 100 optionally comprises a client device type authorization identifier 144. A client device type may comprise a model, category or type of client devices, such as a tablet product model, category or type, a USB dongle product model, category or type. The client device type authorization identifier 144 is an identifier of an authorized client device type, such as an identifier of the client device types that the hearing device 2 may authorize for communication, such as for fitting, maintenance and/or operation. The client device type authorization identifier 144 is for example a bit-field indicating the type of client device the hearing device 2 should allow for fitting.

The hearing device certificate 100 optionally comprises a token parameter 146. The token parameter 146 indicates whether a token-based authentication is to be enabled or not. For example, if the token parameter 146 is set to 0, token-based authentication of client devices is not to be enabled by the hearing device 2 and the hearing device 2 is to use for example a combination of client device type identifier and/or a client device identifier (such as a serial number) to perform an authentication of the client device 10. If for example the token parameter 146 is set to 1, token-based authentication of client devices is to be enabled by the hearing device 2, i.e. the hearing device 2 authenticates the client device 10 (such as a based on a token received from the client device 10). The hearing device 2 may also derive a session specific token based on the received token parameter 146 which is used to e.g. accept the connection to the client device 10 without user intervention.

The hearing device certificate 100 comprises one or more of a hardware platform identifier 138, a software platform identifier 140, and/or a certificate timestamp 142. The hardware platform identifier 138 may identify a hardware platform, such as an operational hearing device hardware platform, i.e. a hardware platform on which the hearing device certificate may be used. The software platform identifier 140 may identify a family of software platforms on which the hearing device certificate is configured to operate. The certificate timestamp 142 refers to a timestamp of production or manufacture of the hearing device certificate 100, such as a timestamp of the manufacturing device 12 indicating a time instant when the hearing device certificate 100 is generated. The certificate timestamp 142 may be in form of e.g.: hour, min, date, month, year.

The hearing device certificate comprises a digital signature 113 and/or a MAC. The digital signature 113 enables a proof or verification of authenticity of the hearing device certificate 100, such as verification of the signer legitimacy (e.g. whether the signer is a legitimate manufacturing device). The digital signature 113 is generated by the manufacturing device 12 using a device family private key during manufacturing of the hearing device. The hearing device 2 or the processing unit 4 may then verify the digital signature 113 when receiving the hearing device certificate 100 comprising the digital signature 113. The digital signature 113 is verifiable by the hearing device 2 using a corresponding device family public key. If the digital signature 113 is not successfully verified using the alleged public key, the hearing device may disregard the hearing device certificate 100 and/or abort normal operation.

Figure 4:
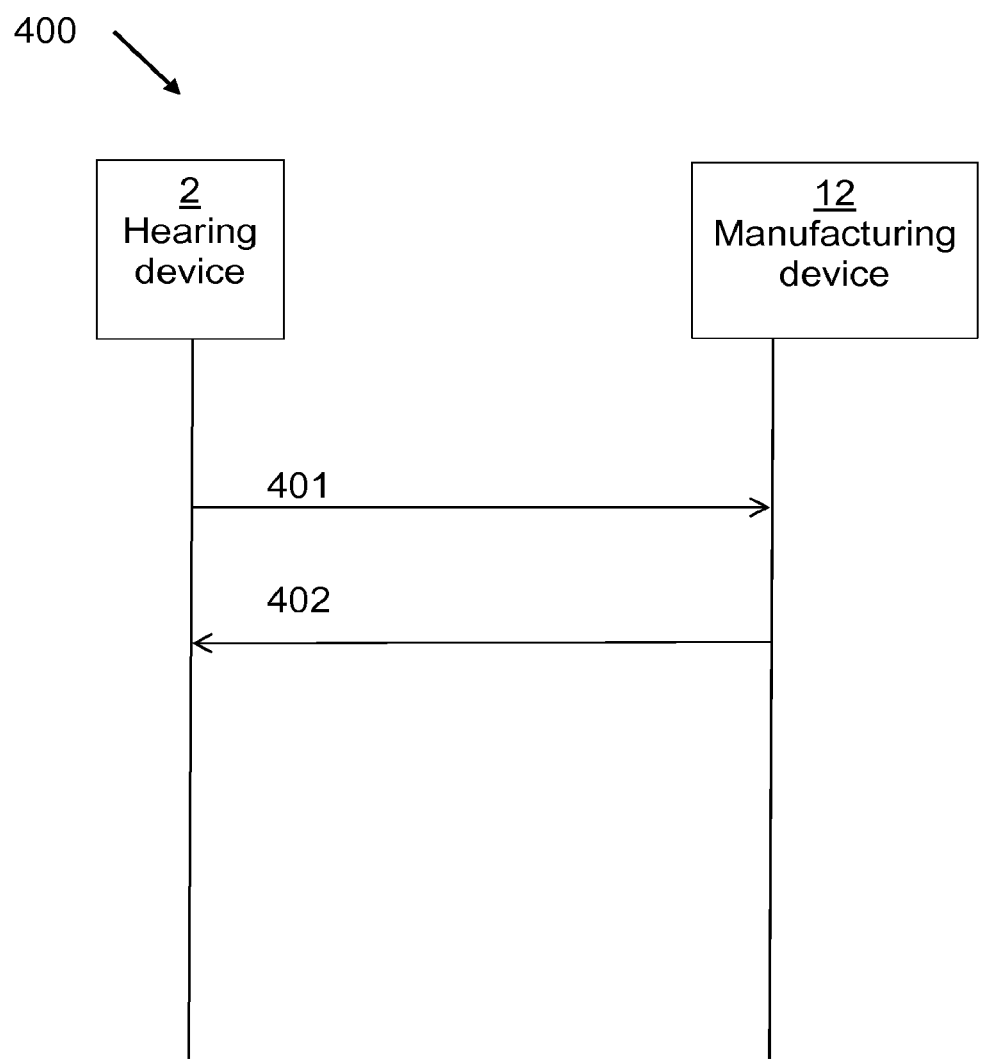

FIG. 4 schematically illustrates an exemplary signalling diagram between a hearing device 2, and a manufacturing device 12. The hearing device 101 may send a hearing device certificate request or message 401 to the manufacturing device 12, possibly upon receiving an identifier request from the manufacturing device 12. The hearing device certificate request 401 may comprise the first hardware identifier 148. The manufacturing device 12 may then identify the hearing device 2 and generate a hearing device identifier 112, based e.g. on a random or pseudo-random number. The manufacturing device 12 may then generate one or more hearing device keys, based on the hearing device identifier 112. The manufacturing device 12 is configured to generate a hearing device certificate 100 including the hearing device identifier 112 and at least one of the generated hearing device keys. The manufacturing device 12 may determine at least one key identifier indicative of a hearing device key and may include the at least one key identifier indicative in the hearing device certificate. The manufacturing device 12 may then generate a hash value of the hearing device certificate 100 without the digital signature and generate the digital signature based on the hashed hearing device certificate without the digital signature. The manufacturing device 12 may then include the digital signature in the hearing device certificate 100. The manufacturing device 12 may transmit a hearing device certificate response 402 comprising the hearing device certificate 100 to the hearing device 2. The manufacturing device 12 may also be configured to write the hearing device certificate 100 directly in the memory unit 6. The hearing device 2 receiving the hearing device certificate may be configured to verify the received hearing device certificate 100 by verifying the digital signature 113, the certificate type identifier 130, the version identifier, the hardware platform identifier 138, the software platform identifier 140, the signing device identifier 136, and/or the hardware identifiers 148. The hearing device 2 may be configured to store the received hearing device certificate 100 in the memory unit 6, e.g. if verification is successful. The hearing device 2 may be configured to retrieve the hearing device certificate from the memory unit and to verify the hearing device certificate by verifying the digital signature 113, the certificate type identifier 130, the version identifier, the hardware platform identifier 138, the software platform identifier 140, the signing device identifier 136, and/or the hardware identifiers 148. If any of the verifications fails, the hearing device 2 may delete the hearing device certificate from the memory unit or disregard the hearing device certificate.

Figure 5:
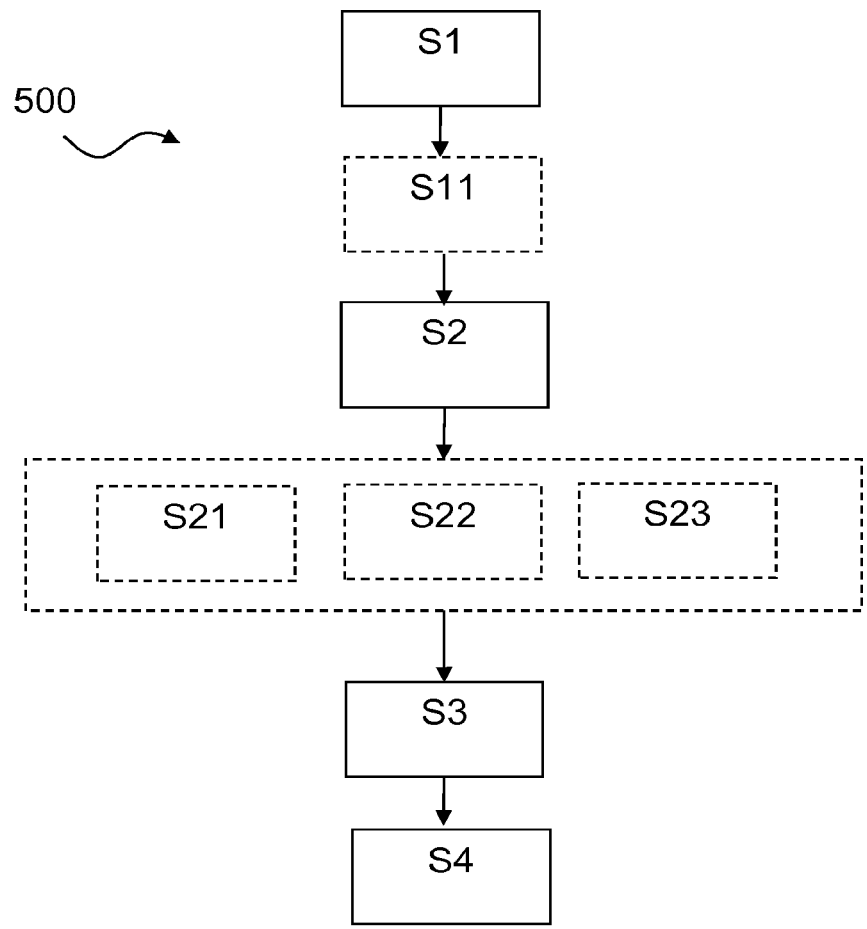

FIG. 5 schematically illustrates a flowchart of an exemplary method 500 of manufacturing a hearing device 2. The method 500 may be performed in a manufacturing device. The hearing device 2 comprises a processing unit 4 configured to compensate for hearing loss of a user of the hearing device, a memory unit 6, and an interface 8. The method 500 comprises generating S1 a hearing device identifier 112. Generating the hearing device identifier may comprise obtaining one or more hardware identifiers, e.g. of the processing unit and/or the interface. Generating S1 the hearing device identifier may be based on hardware identifier(s) of hearing device hardware component(s). Generating S1 the hearing device identifier may comprise generating a random or pseudo-random number. The method 500 may comprise generating S2 one or more hearing device keys based on the hearing device identifier 112. The method comprises generating S3 a hearing device certificate 100 including the hearing device identifier 112 and at least one of the generated hearing device keys; and transmitting S4 the hearing device certificate 100 to the hearing device 2. The hearing device 2 may then store the hearing device certificate 100 in the memory unit 6.

The method 500 comprises obtaining S11 one or more client device keys including a first client device key, and generating S2 one or more hearing device keys is based on the first client device key. The first client device key may be a first client device base key, such as an AES base key dedicated to securing communication with the first client device or device type. The manufacturing device 12 may generate the first client device key and optionally store the first client device key in a data storage. The manufacturing device 12 may generate one or more hearing device keys based on the first client device key. For example, a first hearing device key {HD_KEY_1} for communication with the first client device may be generated as follows:

HD_KEY_1=hash(HD_ID, CD_KEY_1), where hash is a hash function, HD_ID is the hearing device identifier 112 and CD_KEY_1 is the first client device key. This may also be applicable to a second set of hearing device keys based on a second client device key and/or a first secondary hearing device key based on a first secondary client device key In one or more exemplary methods, generating S2 one or more hearing device keys comprises generating a first set 115 of hearing device keys including a first primary hearing device key 115A. A set of hearing device keys may comprise one or more hearing device keys, such as a primary hearing device key 115A, a secondary hearing device key 115B etc . . . . A single key may constitute a set of hearing device keys. The first set 115 of hearing device keys comprises for example a set of first hearing device keys dedicated to enabling secure communication to and from a first client device, such as a first client device type. For example, the first set 115 of hearing device keys HD_KEY_A={HD_KEY_1_1, HD_KEY_1_2, HD_KEY_1_3, HD_KEY_1_4} is generated as follows:

H_KEY_X=hash(HD_ID, CD_KEY_X), where hash is a hash function, X is an index identifying respective hearing device keys to be produced for the first set (e.g. X={1, 2, 3, 4} for first primary hearing device key 115A, first secondary hearing device key 115B, first tertiary hearing device key 115c, first quaternary hearing device key 115D), HD_ID is the hearing device identifier 112 and CD_KEY_X is the X'th first client device key. This is also applicable to a second set 117 of hearing device keys based on second client device key(s) and/or a third set 119 of hearing device keys based on third client device key(s).

The method 500 may comprise obtaining S21 a first hearing device key identifier 114 indicative of a hearing device key of the first set 115 of hearing device keys. Obtaining S21 the first hearing device key identifier may comprise generating the first hearing device key identifier 114, such as setting the first hearing device key identifier 114 to a value indicative of which hearing device key(s) are comprised in the hearing device certificate (first set 115 of hearing device keys). Generating S3 the hearing device certificate comprises including the first set 115 of hearing device keys and the first hearing device key identifier 114 in the hearing device certificate 100.

In one or more exemplary methods, generating S2 one or more hearing device keys comprises generating a second set 117 of hearing device keys including a second primary hearing device key 117A. The method 500 may comprise obtaining S22 a second hearing device key identifier 116 indicative of a hearing device key of the second set 117 of hearing device keys. Generating S3 the hearing device certificate may comprise including the second set 117 of hearing device keys and the second hearing device key identifier 116 in the hearing device certificate 100. In one or more exemplary methods, generating S2 one or more hearing device keys comprises generating a third set 119 of hearing device keys including a third primary hearing device key 119A. The method 500 may comprise obtaining a third hearing device key identifier 118 indicative of a hearing device key of the third set 119 of hearing device keys. Generating S3 the hearing device certificate may comprise including the third set 119 of hearing device keys and the third hearing device key identifier 118 in the hearing device certificate 100.

In one or more exemplary methods, generating S3 the hearing device certificate comprises generating a digital signature 113 and including the digital signature 113 in the hearing device certificate 100. Generating a digital signature 113 involves e.g. a private-public key pair and a signature generation function. Examples of signature generation and verification systems include RSA cryptosystem (described above).

The method 500 may comprise obtaining S23 a first hardware identifier 148 of the hearing device 2. Obtaining S23 the first hardware identifier 148 of the hearing device 2 may comprise receiving the first hardware identifier 148 of the hearing device 2, and/or retrieving the first hardware identifier 148 of the hearing device 2 from a data storage. The hearing device 2 may retrieve or read the hardware identifier 148 from the memory unit, such as from a register, and may transmit the hardware identifier 148 to the manufacturing device 12. The first hardware identifier 148 may comprise a serial number, a medium access control, MAC, address, a chip identifier, or any combination thereof. Generating S3 the hearing device certificate 100 may comprise including the first hardware identifier 148 in the hearing device certificate 100. The hearing device 2 receiving the hearing device certificate 100 including the first hardware identifier 148 may then verify the hearing device certificate 100 by comparing its stored first hardware identifier and the first hardware identifier 148 included in the received hearing device certificate 100.

In one or more exemplary methods, generating S3 the hearing device certificate may comprise including one or more of a certificate type identifier 130, a signing device identifier 136, one or more hardware identifiers including a first hardware identifier 148, a client device type authorization identifier 144, and/or a token parameter 146 in the hearing device certificate 100. The hearing device 2 uses the certificate type identifier 130, the client device type authorization identifier 144, and/or the token parameter 146 in the hearing device certificate to control and authorize client devices to access the hearing device. The hearing device 2 may use the signing device identifier 136 to authenticate the hearing device certificate 100. The hearing device 2 may use the one or more hardware identifiers, including the first hardware identifier 148, to verify that the hearing device certificate 100 is indeed intended for the hearing device 2.

In one or more exemplary methods, generating S3 the hearing device certificate comprises including a hardware platform identifier 138, a software platform identifier 140, and/or a certificate timestamp 142 in the hearing device certificate 100. The hearing device 2 optionally uses the hardware platform identifier 138, the software platform identifier 140, and/or the certificate timestamp 142 in the hearing device certificate 100 to verify compatibility with a hardware, or a firmware of the hearing device 2, and optionally to perform revocation.

Exemplary hearing devices and methods are set out in the following items.

Item 1. A hearing device comprising
a processing unit configured to compensate for hearing loss of a user of the hearing device;
a memory unit; and
an interface,
wherein the memory unit has a hearing device certificate stored thereon, the hearing device certificate comprising:
a hearing device identifier;
at least one hearing device key identifier indicative of a hearing device key; and
a plurality of hearing device keys.

Item 2. Hearing device according to item 1, wherein the plurality of hearing device keys comprises a first set of hearing device keys including a first primary hearing device key, and wherein the at least one hearing device key identifier comprises a first hearing device key identifier indicative of a hearing device key of the first set of hearing device keys.

Item 3. Hearing device according to any of items 1-2, wherein the plurality of hearing device keys comprises a second set of hearing device keys including a second primary hearing device key, and wherein the at least one hearing device key identifier comprises a second hearing device key identifier indicative of a hearing device key of the second set of hearing device keys.

Item 4. Hearing device according to any of items 1-3, wherein the hearing device certificate comprises a certificate type identifier.

Item 5. Hearing device according to any of items 1-4, wherein the hearing device certificate comprises a signing device identifier.

Item 6. Hearing device according to any of items 1-5, wherein the hearing device certificate comprises one or more hardware identifiers.

Item 7. Hearing device according to any of items 1-6, wherein the hearing device certificate comprises a client device type authorization identifier.

Item 8. Hearing device according to any of items 1-7, wherein the hearing device certificate comprises a token parameter.

Item 9. Hearing device according to any of items 1-8, wherein the hearing device certificate comprises a hardware platform identifier.

Item 10. Hearing device according to any of items 1-9, wherein the hearing device certificate comprises a software platform identifier.

Item 11. Hearing device according to any of items 1-10, wherein the hearing device certificate comprises a certificate timestamp.

Item 12. Hearing device according to any of items 1-11, wherein the hearing device certificate comprises a digital signature and/or a message authentication code.

Item 13. A method of manufacturing a hearing device comprising a processing unit configured to compensate for hearing loss of a user of the hearing device, a memory unit, and an interface, the method comprising:
generating a hearing device identifier;
generating one or more hearing device keys based on the hearing device identifier;
generating a hearing device certificate including the hearing device identifier and at least one of the generated hearing device keys; and
transmitting the hearing device certificate to the hearing device.

Item 14. Method according to item 13, wherein the method comprises obtaining one or more client device keys including a first client device key, and wherein generating one or more hearing device keys is based on the first client device key.

Item 15. Method according to any of items 13-14, wherein generating one or more hearing device keys comprises generating a first set of hearing device keys including a first primary hearing device key, the method comprising obtaining a first hearing device key identifier indicative of a hearing device key of the first set of hearing device keys, and wherein generating the hearing device certificate comprises including the first set of hearing device keys and the first hearing device key identifier in the hearing device certificate.

Item 16. Method according to any of items 13-15, wherein generating one or more hearing device keys comprises generating a second set of hearing device keys including a second primary hearing device key, the method comprising obtaining a second hearing device key identifier indicative of a hearing device key of the second set of hearing device keys, and wherein generating the hearing device certificate comprises including the second set of hearing device keys and the second hearing device key identifier in the hearing device certificate.

Item 17. Method according to any of items 13-16, wherein generating the hearing device certificate comprises generating a digital signature and including the digital signature in the hearing device certificate.

Item 18. Method according to any of items 13-17, wherein generating the hearing device identifier comprises generating a random or pseudo-random number.

Item 19. Method according to any of items 13-18, the method comprising obtaining a first hardware identifier of the hearing device, and wherein generating the hearing device certificate comprises including the first hardware identifier in the hearing device certificate.

Item 20. Method according to any of items 13-19, wherein generating the hearing device certificate comprises including one or more of a certificate type identifier, a signing device identifier, one or more hardware identifiers, a client device type authorization identifier, and/or a token parameter in the hearing device certificate.

Item 21. Method according to any of items 13-20, wherein generating the hearing device certificate comprises including a hardware platform identifier, a software platform identifier, and/or a certificate timestamp in the hearing device certificate.

The use of the terms "first", "second", "primary", "secondary", "tertiary", "quaternary" and the like does not imply any particular order, but they are included to identify individual elements. Moreover, the use of the terms first, second, etc. does not denote any order or importance, but rather the terms first, second, etc. are used to distinguish one element from another. Note that the words first and second are used here and elsewhere for labelling purposes only and are not intended to denote any specific spatial or temporal ordering. Furthermore, the labelling of a first element does not imply the presence of a second element.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES 1 system
2 hearing device
4 processing unit
5 microphone
6 memory unit
7 receiver
8 interface
10 client device
12 manufacturing device
14 fitting device
16 server device
21 communication link between client device and hearing device
22 communication link between server device and manufacturing device
23 communication link between hearing device and manufacturing device
24 communication link between server device and client device/fitting device
100 hearing device certificate
112 hearing device identifier
113 digital signature
114 first hearing device key identifier
115 first set of hearing device keys
115A first primary hearing device key
115B first secondary hearing device key
115C first tertiary hearing device key
115D first quaternary hearing device key
116 second hearing device key identifier
117 second set of hearing device keys
117A second primary hearing device key
117B second secondary hearing device key
117C second tertiary hearing device key
117D second quaternary hearing device key
118 third hearing device key identifier
119 third set of hearing device keys
119A third primary hearing device key
119B third secondary hearing device key
119C third tertiary hearing device key
119D third quaternary hearing device key
130 certificate type identifier
136 signing device identifier
138 hardware platform identifier
140 software platform identifier
142 certificate timestamp
144 client device type authorization identifier
146 token parameter
148 first hardware identifier
400 signalling diagram
401 hearing device certificate request
402 hearing device certificate response
500 method

The invention claimed is:

1. A hearing device comprising:
a processing unit configured to compensate for hearing loss of a user of the hearing device; and
a memory unit;
wherein the memory unit is configured to store:
a device identifier, and
a device key identifier indicative of a device key;
wherein the device identifier and the device key identifier are stored in association with each other in the memory unit of the hearing device.

2. The hearing device according to claim 1, wherein the device key identifier is a part of a device certificate stored in the memory unit.

3. The hearing device according to claim 1, wherein the memory unit is configured to store the device key.

4. The hearing device according to claim 3, wherein the memory unit is configured to store one or more additional device key(s).

5. The hearing device according to claim 3, wherein the memory unit is configured to store the device key in association with the device identifier.

6. A hearing device comprising:
a processing unit configured to compensate for hearing loss of a user of the hearing device; and
a memory unit;
wherein the memory unit is configured to store:
a device identifier, and
a device key identifier indicative of a device key, wherein the device key is based on, or is uniquely tied to, the device identifier.

7. The hearing device according to claim 6, wherein the device key comprises a first hearing device key.

8. The hearing device according to claim 7, wherein the memory is configured to store the first hearing device key and a second hearing device key.

9. The hearing device according to claim 8, wherein the first hearing device key is for enabling the hearing device to communicate with a client device, and the second hearing device key is for enabling the hearing device to communicate with the client device.

10. The hearing device according to claim 8, wherein the first hearing device key is for enabling the hearing device to communicate with a first client device, and the second hearing device key is for enabling the hearing device to communicate with a second client device.

11. The hearing device according to claim 6, wherein the device identifier comprises one or more hardware identifiers.

12. The hearing device according to claim 6, wherein the device key is unique for the hearing device.

13. The hearing device according to claim 6, wherein device key is a part of a data structure.

14. The hearing device according to claim 13, wherein the data structure comprises a certificate-type identifier.

15. The hearing device according to claim 13, wherein the data structure comprises a signing device identifier.

16. The hearing device according to claim 13, wherein the data structure comprises a hardware platform identifier, and/or a software platform identifier.

17. The hearing device according to claim 13, wherein the data structure comprises a client-device-type authorization identifier.

18. The hearing device according to claim 13, wherein the data structure comprises a token parameter.

19. The hearing device according to claim 13, wherein the data structure comprises a certificate timestamp.

20. The hearing device according to claim 13, wherein the data structure comprises a digital signature and/or a message authentication code.

21. The hearing device according to claim 6, wherein the device key identifier is a part of a device certificate stored in the memory unit.

22. The hearing device according to claim 6, wherein the memory unit is configured to store the device key.

23. The hearing device according to claim 22, wherein the memory unit is configured to store one or more additional device key(s).

24. The hearing device according to claim 22, wherein the memory unit is configured to store the device key in association with the device identifier.

25. A hearing device comprising:
a processing unit configured to compensate for hearing loss of a user of the hearing device; and
a memory unit;
wherein the memory unit is configured to store:
a device identifier, and
a device key identifier indicative of a device key, wherein the device key is configured for enabling the hearing device to communicate with one or more client device(s);
wherein the device identifier and the device key identifier are stored in association with each other in the memory unit of the hearing device.

26. The hearing device according to claim 25, wherein the device key comprises a first device key, and wherein the memory unit is configured to store the first device key and a second device key.

27. The hearing device according to claim 26, wherein the one or more client device(s) comprises a first client device, and wherein the first device key is for enabling the hearing device to communicate with the first client device, and the second device key is for enabling the hearing device to communicate with the first client device.

28. The hearing device according to claim 26, wherein the one or more client device(s) comprises a first client device and a second client device, and wherein the first device key is for enabling the hearing device to communicate with the first client device, and the second device key is for enabling the hearing device to communicate with the second client device.

29. The hearing device according to claim 26, wherein the first device key is based on, or is uniquely tied to, the device identifier; and
wherein the second device key is based on, or is uniquely tied to, the device identifier.

30. The hearing device according to claim 25, wherein the device identifier comprises one or more hardware identifiers.

31. The hearing device according to claim 25, wherein the device key is unique for the hearing device.

32. The hearing device according to claim 25, wherein device key is a part of a data structure.

33. The hearing device according to claim 32, wherein the data structure also comprises a certificate-type identifier.

34. The hearing device according to claim 32, wherein the data structure comprises a signing device identifier.

35. The hearing device according to claim 32, wherein the data structure comprises a hardware platform identifier, and/or a software platform identifier.

36. The hearing device according to claim 32, wherein the data structure comprises a client-device-type authorization identifier.

37. The hearing device according to claim 32, wherein the data structure comprises a token parameter.

38. The hearing device according to claim 32, wherein the data structure comprises a certificate timestamp.

39. The hearing device according to claim 32, wherein the data structure comprises a digital signature and/or a message authentication code.

40. The hearing device according to claim 25, wherein the device key identifier is a part of a device certificate stored in the memory unit.

41. The hearing device according to claim 25, wherein the memory unit is configured to store the device key.

42. The hearing device according to claim 41, wherein the memory unit is configured to store one or more additional device key(s).

43. The hearing device according to claim 41, wherein the memory unit is configured to store the device key in association with the device identifier.

* * * * *